(12) United States Patent
Horng et al.

(10) Patent No.: US 8,154,161 B2
(45) Date of Patent: Apr. 10, 2012

(54) MINIATURE MOTOR

(75) Inventors: Alex Horng, Kaohsiung (TW); Tso-Kuo Yin, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 197 days.

(21) Appl. No.: 12/645,580

(22) Filed: Dec. 23, 2009

(65) Prior Publication Data

US 2011/0148226 A1 Jun. 23, 2011

(51) Int. Cl.
*H02K 29/08* (2006.01)
(52) U.S. Cl. ...................... 310/68 B; 310/268
(58) Field of Classification Search .................. 310/268, 310/156.32, 68 B
See application file for complete search history.

(56) References Cited

U.S. PATENT DOCUMENTS

| | | | | |
|---|---|---|---|---|
| 4,620,139 A * | 10/1986 | Egami et al. | ............. | 318/400.01 |
| 4,728,833 A * | 3/1988 | Shiraki et al. | ............... | 310/68 R |
| 4,973,869 A * | 11/1990 | Cho | ............ | 310/68 B |
| 6,573,627 B2 * | 6/2003 | Sun | ................. | 310/81 |
| 6,836,039 B2 * | 12/2004 | Kweon et al. | .................. | 310/81 |
| 7,157,823 B2 * | 1/2007 | Noguchi | ......................... | 310/81 |
| 2010/0259114 A1 * | 10/2010 | Kim et al. | ................. | 310/49.03 |

FOREIGN PATENT DOCUMENTS

| TW | 505337 | 10/2002 |
|---|---|---|
| TW | 523219 | 3/2003 |
| TW | 539346 | 6/2003 |
| TW | 555290 | 9/2003 |
| TW | I221048 | 9/2004 |
| TW | I287909 | 10/2007 |

* cited by examiner

*Primary Examiner* — Dang Le

(74) *Attorney, Agent, or Firm* — Alan Kamrath; Kamrath IP Lawfirm, PA

(57) ABSTRACT

A miniature motor includes a substrate having a pivotal portion. A coil unit and a detection element are provided around the pivotal portion. A rotor is rotatably mounted to the pivotal portion and includes a hub and a permanent magnet mounted to the hub and aligned with the coil unit and the detection element. The permanent magnet includes a plurality of north and south poles each having a stronger magnetism section. A weaker magnetism section is formed between two adjacent stronger magnetism sections. At least one auxiliary starting member is mounted between the substrate and the rotor and aligned with the permanent magnet. When the rotor stops rotating, the at least one auxiliary starting member aligns with and magnetically attracts at least one of the stronger magnetism sections, locating the detection element in a position not aligned with the weaker magnetism sections along an axis of the hub.

15 Claims, 11 Drawing Sheets

MINIATURE MOTOR

BACKGROUND OF THE INVENTION

1. Field of the Invention

The present invention relates to a miniature motor and, more particularly, to a miniature motor that can be started easily.

2. Description of the Related Art

Conventional motors generally include a base, a rotor and a stator unit. The base includes a shaft tube to which the rotor is rotatably mounted. The stator unit is mounted to the base and comprised of a plurality of silicon steel plates and a plurality of coils. The rotor can be driven by a magnetic field created by the stator unit when supplied with electricity. However, difficulties and dead angles exist during starting of the motors. Easy-to-start designs for motors have been proposed to solve these problems.

FIG. 1 shows a conventional motor including a rotor 82 and a stator 8 having a plurality of stacked silicon steel plates 81. Each silicon steel plate 81 includes a plurality of radial extensions 811 each having a pole shoe 812 at a distal end thereof. Each pole shoe 812 has two sections on opposite sides of a central line of the pole shoe 812. The sections are asymmetric to each other relative to the central line to provide a shift of magnetic flux. Thus, the stator 8 can create an asymmetric magnetic path to change the waveforms of the output torque while starting a rotor, eliminating dead angles of starting. An example of such a structure is disclosed in Taiwan Patent No. I221048. However, the asymmetric shape of the pole shoes 812 of the stator 8 renders a complicated structure as well as difficulties in manufacturing the silicon steel plates 81, increasing the manufacturing costs. Furthermore, the asymmetric pole shoes 812 increase the gap between the stator 8 and the rotor 82, adversely affecting the operational efficiency of the motor. Further, the stator 8 comprised of the silicon steel plates 81 has a certain axial height and a complicated structure, resulting in difficulties in designs of compact, miniature motors.

Taiwan Patent Publication No. 505337 discloses an easy-to-start brushless DC motor including a stator having upper and lower pole pieces each having magnetic plates angularly spaced at regular intervals. Taiwan Patent Publication No. 539346 discloses a set of silicon steel plates forming first and second poles having a phase difference in a magnetic pole angle therebetween. Taiwan Patent Publication No. 555290 discloses a stator with a radial winding, with a magnetic pole face of each pole plate of the stator having a notch. Taiwan Patent No. I287909 discloses an easy-to-start motor including a stator unit having a magnetic pole face with a stronger magnetism section and a weaker magnetism section. The stators of these patents, though having different shapes, still require complicated manufacturing processes and high manufacturing costs. The resultant motor structure is complex and difficult to reduce in size due to certain heights of the stators.

FIG. 2 shows another conventional easy-to-start brushless DC motor including a base 91 and a rotor 92. The base 91 includes an annular wall to which a plurality of coils 911 and an IC controlling element are mounted. The annular wall includes a positioning hole 912 between two adjacent coils 911. A positioning member 913 is received in the positioning hole 912. The rotor 92 is rotatably mounted to the base 91. The rotor 92 includes an annular permanent magnet 921 having a strong magnetism section. When the rotor 92 stops rotating, the positioning member 913 is magnetically attracted and positioned by the strong magnetism section, assuring starting of the motor by avoiding failing of detection of the polarity of the permanent magnet 921 by the IC controlling element. An example of such a structure is disclosed in Taiwan Patent Publication No. 523219. Although the motor of FIG. 2 without stacked silicon steel plates can be manufactured by simpler processes, the base 91 must include the positioning hole 912 to receive the positioning member 913 for assuring reliable starting of the motor, leading to difficulties in manufacturing the base 91. Furthermore, the positioning member 913 must extend a certain length along an axial direction of the rotor 92 so as to align with the coil unit 911 around the annular wall of the base 91, leading to difficulties in reducing the axial height of the base 91 having the positioning member 913 and in designs of compact, miniature motors.

SUMMARY OF THE INVENTION

An objective of the present invention is to provide an easy-to-start miniature motor having a reduced axial height.

Another objective of the present invention is to provide an easy-to-start miniature motor that is simpler in structure.

The present invention fulfills the above objectives by providing, in a preferred aspect, a miniature motor including a substrate having a pivotal portion. A circuit board is mounted to the substrate and includes a coil unit and a detection element. A rotor includes a hub and a permanent magnet. The rotor is rotatably mounted to the pivotal portion of the substrate. The permanent magnet is mounted to the hub and aligned with the coil unit and the detection element. The permanent magnet includes a plurality of north poles and a plurality of south poles. Each of the plurality of north and south poles includes a stronger magnetism section. A weaker magnetism section is formed between two adjacent stronger magnetism sections. At least one magnetically attractive auxiliary starting member is mounted between the substrate and the rotor and aligned with the permanent magnet. When the rotor stops rotating, at least one of the stronger magnetism sections of the permanent magnet aligns with and magnetically attracts the at least one auxiliary starting member, locating the detection element in a position not aligned with the weaker magnetism sections along an axis of the hub. By such an arrangement, the miniature motor is easy to start, simple in structure, and easy to manufacture at low costs. Furthermore, the miniature motor has a reduced axial height.

The at least one auxiliary starting member can be mounted to a side of the circuit board, and the at least one auxiliary starting member is located between the permanent magnet and the circuit board. Thus, the at least one auxiliary starting member can be closer to the permanent magnet to increase the attraction effect therebetween, reliably locating the rotor in an optimal position for starting. In an example, the at least one auxiliary starting member includes an engaging face and a magnetic attraction face opposite to the engaging face. The engaging face is mounted to a side of the circuit board, and the magnetic attraction face faces the permanent magnet. By such an arrangement, the at least one auxiliary starting member lies flat on the circuit board to reduce the axial height.

In a preferred example, the at least one auxiliary starting member includes a ring having an inner periphery and two diametrically opposed magnetic attraction pieces extending radially inward from the inner periphery of the ring. The magnetic attraction pieces are aligned with the permanent magnet along the axis of the hub. Rotational stability of the rotor is, thus, maintained. The ring includes a central assembling hole in which the circuit board is mounted, providing reliable assembly. The circuit board has an axial height along the axis of the hub equal to that of the at least one auxiliary starting member. Two sides of the circuit board are respectively flush with two sides of the auxiliary starting member. The axial height is, thus, reduced.

In a preferred example, the at least one auxiliary starting member includes two diametrically opposed auxiliary starting members to maintain rotational stability for the rotor.

In preferred examples, the permanent magnet of the rotor and the coil unit have an axial gap therebetween, simplifying the structure and reducing the overall volume.

In preferred examples, the coil unit is formed on a side of the circuit board by layout, reducing the axial height of the circuit board and simplifying the structure of the circuit board.

The miniature motor according to the teachings of the present invention does not have to include the circuit board. Furthermore, the coil unit and the detection element can be directly mounted on the substrate. Further, the at least one auxiliary starting member includes an engaging face and a magnetic attraction face. The engaging face is mounted to a side of the circuit board, and the magnetic attraction face faces the permanent magnet. Thus, the structure is further simplified, and the axial height is further reduced.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

Figure 1:
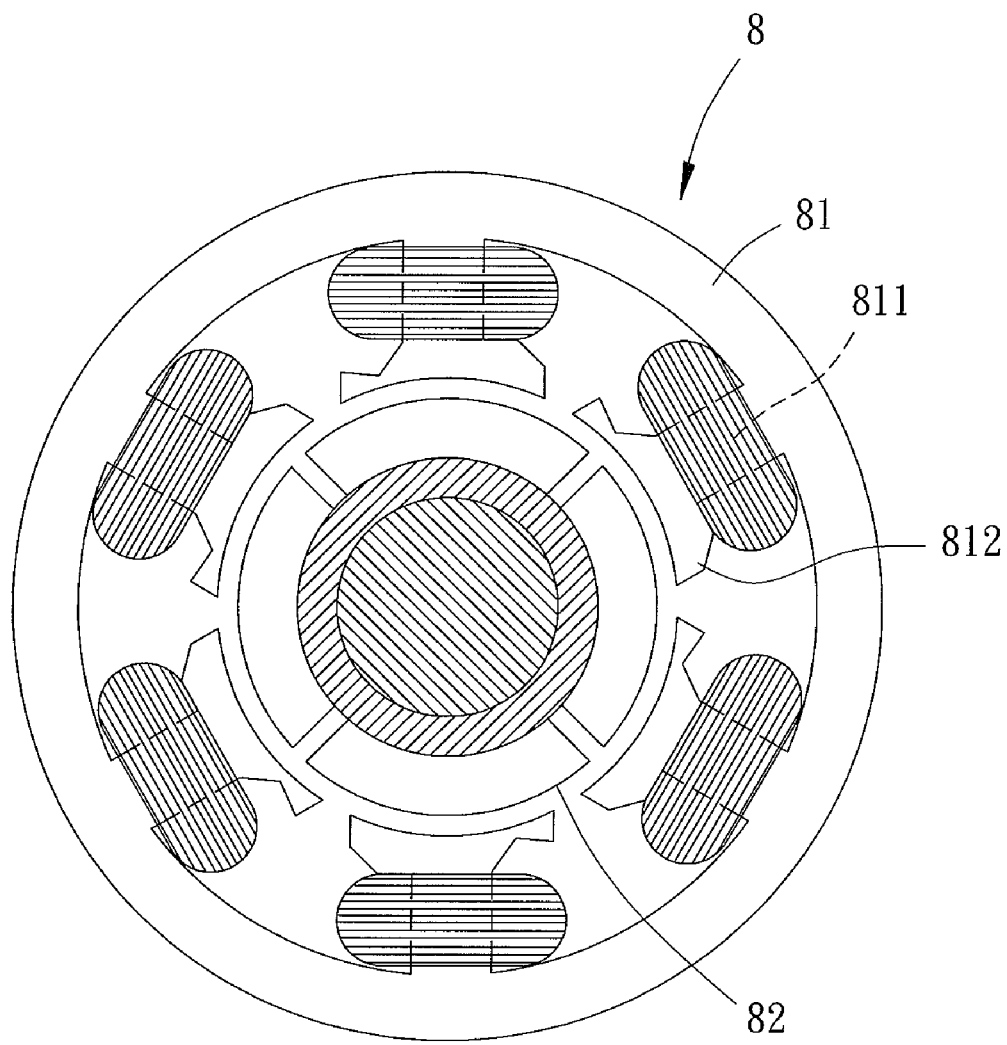
FIG. 1 shows a cross sectional view of a conventional motor.
Figure 2:
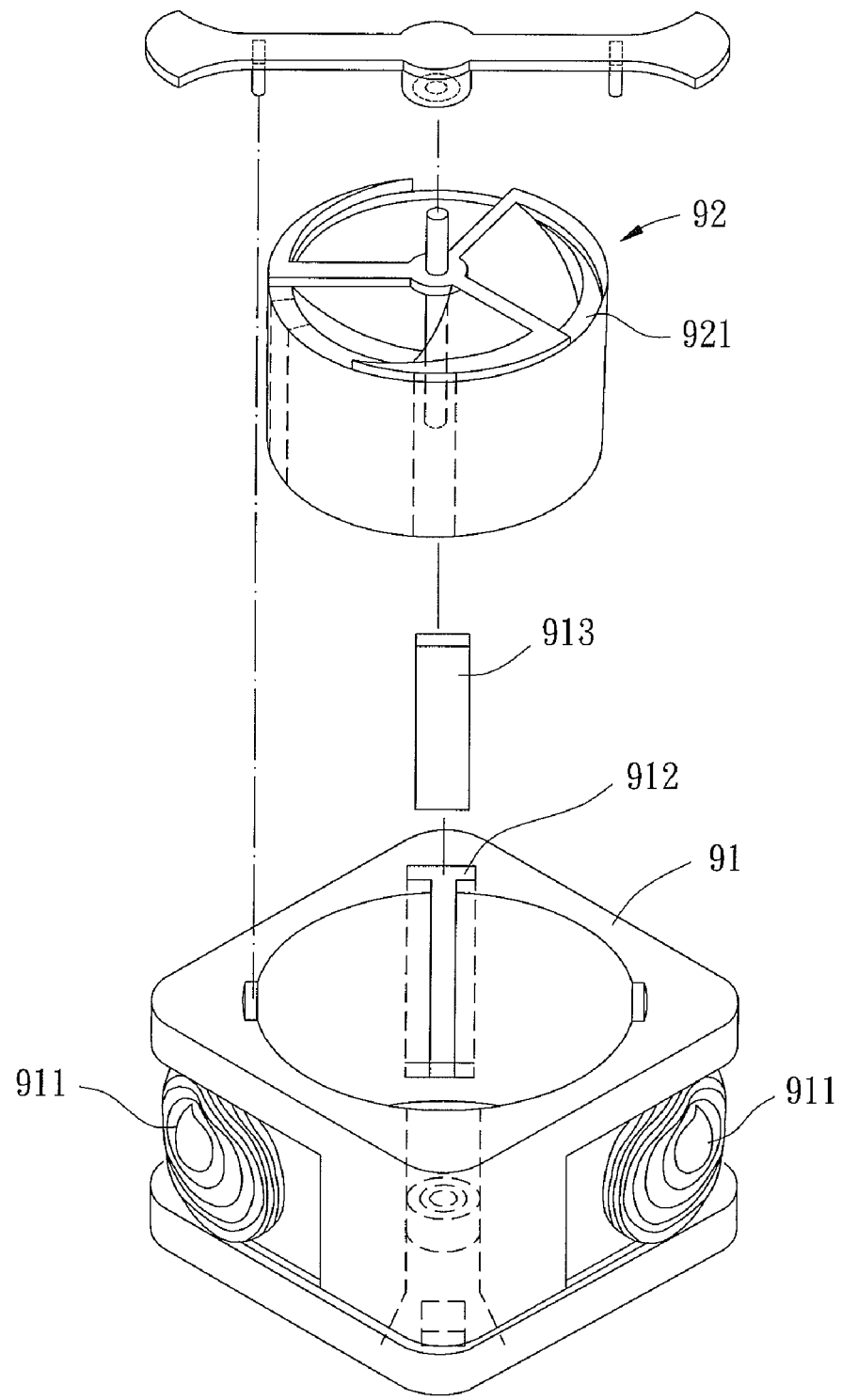
FIG. 2 shows an exploded, perspective view of another conventional motor.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "inner", "side", "portion", "section", "axial", "radial", "annular", "inward", "height", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

A miniature motor of a first embodiment according to the preferred teachings of the present invention is shown in FIGS. 3-11. The miniature motor includes a substrate 1, a circuit board 2, a rotor 3, and at least one auxiliary starting member 4. The circuit board 2 is mounted to the substrate 1. The rotor 3 is rotatably mounted to the substrate 1. The at least one auxiliary starting member 4 is mounted between the substrate 1 and the rotor 3 to allow easy starting of the rotor 3.

The substrate 1 includes a pivotal portion 11 on a side thereof. The pivotal portion 11 can be in the form of a shaft tube, shaft seat, or any other structure capable of providing rotational engagement for the rotor 3. In the preferred forms shown in FIGS. 3-11, the pivotal portion 11 is in the form of a shaft tube receiving a bearing 12.

The circuit board 2 is mounted to the side of the substrate 1 around the pivotal portion 11. The circuit board 2 includes a coil unit 21 and a detection element 22. The coil unit 21 can be comprised of a plurality of coils. The detection element 22 detects the polarity of a magnetic pole. As an example, the detection element 22 can be a Hall element. The circuit board 2 can be an annular printed circuit board having a central through-hole 23 through which the pivotal portion 11 extends.

The rotor 3 includes a hub 31 and a permanent magnet 32. The hub 31 includes a shaft 311 rotatably mounted to the pivotal portion 11 of the substrate 1. The permanent magnet 32 is annular and mounted to an inner periphery of an annular wall of the hub 31. The permanent magnet 32 is aligned with the coil unit 21 and the detection element 22 along an axis of the hub 31. Furthermore, the permanent magnet 32 includes a plurality of north poles N and a plurality of south poles S. The north and south poles N and S are alternately disposed. Each of the north and south poles N and S includes a stronger magnetism section 321 having stronger magnetism and distant to an adjoining section of a pair of north and south poles N and S adjacent to each other. A weaker magnetism section 322 having weaker magnetism is formed between two adjacent stronger magnetism sections 321 and located in the adjoining section of a pair of north and south poles N and S.

The at least one auxiliary starting member 4 is in the form of a magnetically attractive plate (such as a metal plate) mounted between the substrate 1 and the rotor 3. The auxiliary starting member 4 is aligned with the permanent magnet 32 along the axis of the hub 31.

In use of the miniature motor of the first embodiment according to the preferred teachings of the present invention, the circuit board 2 controls the coil unit 21 to create alternating magnetic fields to act with the north and south poles N and S of the permanent magnet 32, driving the rotor 3 to rotate about a pivot connection of the shaft 311 and the pivotal portion 11.

When the rotor 3 stops rotating, at least one of the stronger magnetism sections 321 of the permanent magnet 32 attracts the at least one auxiliary starting member 4 to make sure the rotor 3 stops in an optimal position for starting. Specifically, when the rotor 3 stops rotating, the detection element 22 will be located in a position aligned with one of the stronger magnetism sections 321 along the axis of the hub 31 due to mutual attraction between the at least one auxiliary starting member 4 and at least one of the stronger magnetism sections 321. Thus, the detection element 22 is not aligned with the weaker magnetism sections 322. It can be appreciated that the detection element 22 according to the teachings of the present invention is so arranged that it will be in a position aligned with one of the stronger magnetism sections 321 under mutual attraction between the at least one auxiliary starting member 4 and at least one of the stronger magnetism sections 321. As a result, when the rotor 3 is restarted by the coil unit 21, the detection unit 22 adjacent to the stronger magnetism section 321 can rapidly detect the polarity of the permanent magnet 32. Accordingly, the miniature motor according to the preferred teachings of the present invention is easier to start and has no dead angles of starting.

Furthermore, the miniature motor according to the teachings of the present invention has a simple structure by directly mounting the auxiliary starting member 4 between the substrate 1 and the rotor 3, such that the auxiliary starting member 4 occupies a smaller space. Further, the coil unit 21 is also simple in structure, avoiding use of conventional silicon steel plates. Thus, the miniature motor according to the teachings of the present invention has a simple structure and reduced axial height along the axis of the hub 31 while allowing easy starting of the rotor 3. A motor allowing compact, miniature designs is, thus, provided.

The number of the auxiliary starting member 4 of the miniature motor according to the teachings of the present invention can be one or more. Furthermore, the locations of the auxiliary starting member 4 mounted between the substrate 1 and the rotor 3 can be selected according to different effects to be provided.

Figure 3:
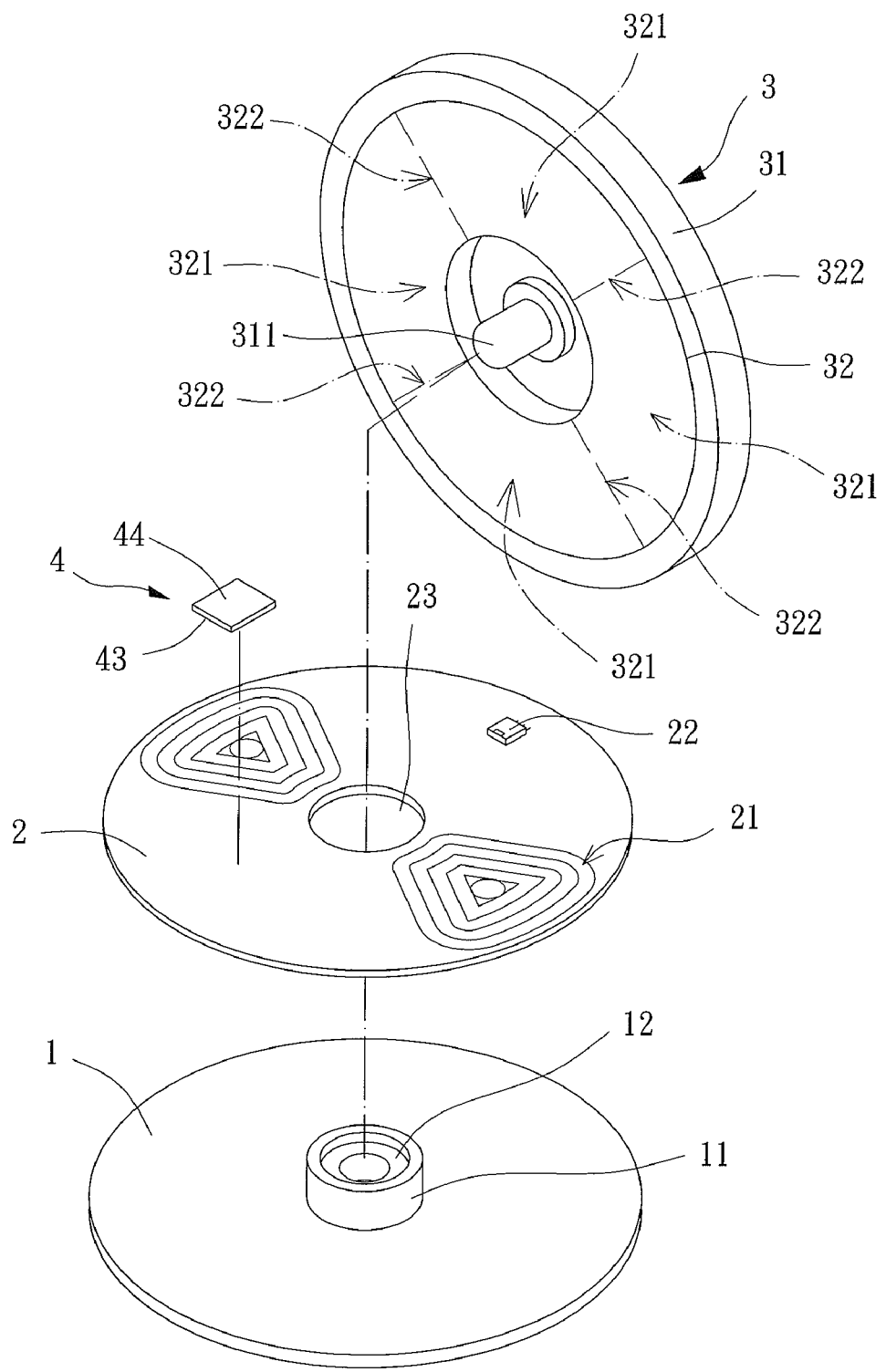
FIG. 3 shows an exploded, perspective view of a miniature motor of a first example of a first embodiment according to the preferred teachings of the present invention.
Figure 4:
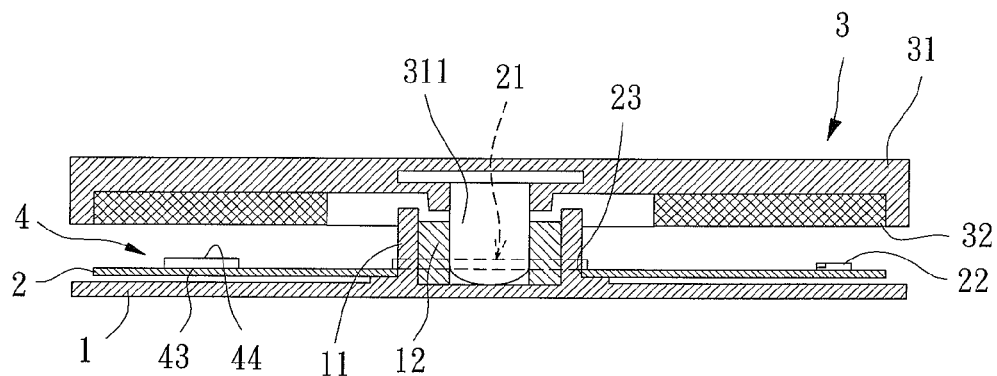
FIG. 4 shows a cross sectional view of the miniature motor of FIG. 3.
Figure 5:
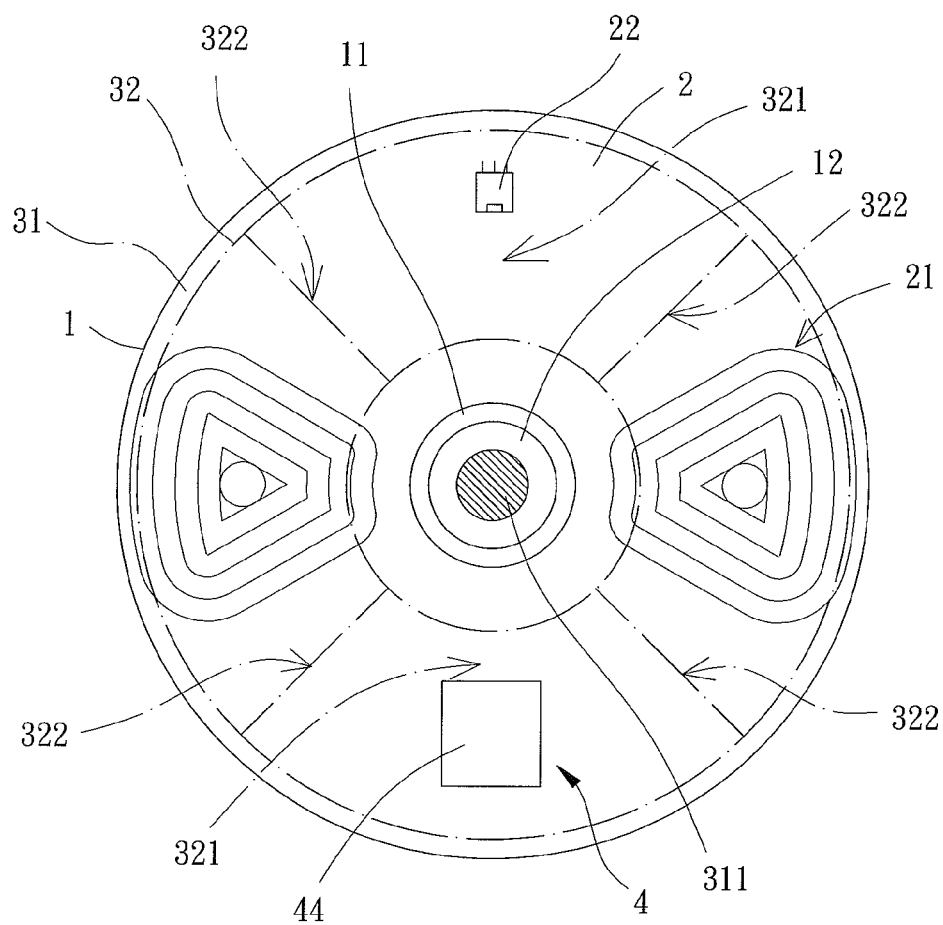
FIG. 5 shows a top view of the miniature motor of FIG. 3.

In a first example shown in FIGS. 3-5, the miniature motor includes an auxiliary starting member 4 mounted on a side of the circuit board 2, so that the auxiliary starting member 4 is located between the substrate 1 and the rotor 3. Furthermore, the auxiliary starting member 4 is adjacent to the permanent magnet 32 to increase the attraction effect between the permanent magnet 32 and the auxiliary starting member 4. Thus, after the rotor 3 stops rotating, the auxiliary starting member 4 can more easily stop the rotor 3 in an optimal position for starting. Furthermore, the auxiliary starting member 4 includes an engaging face 43 and a magnetic attraction face 44 opposite to the engaging face 43. The engaging face 43 is in surface contact with the side of the circuit board 2, and the magnetic attraction face 44 faces the permanent magnet 32. Thus, the auxiliary starting member 4 lies flat on the circuit board 2, reducing the overall axial height.

Figure 6:
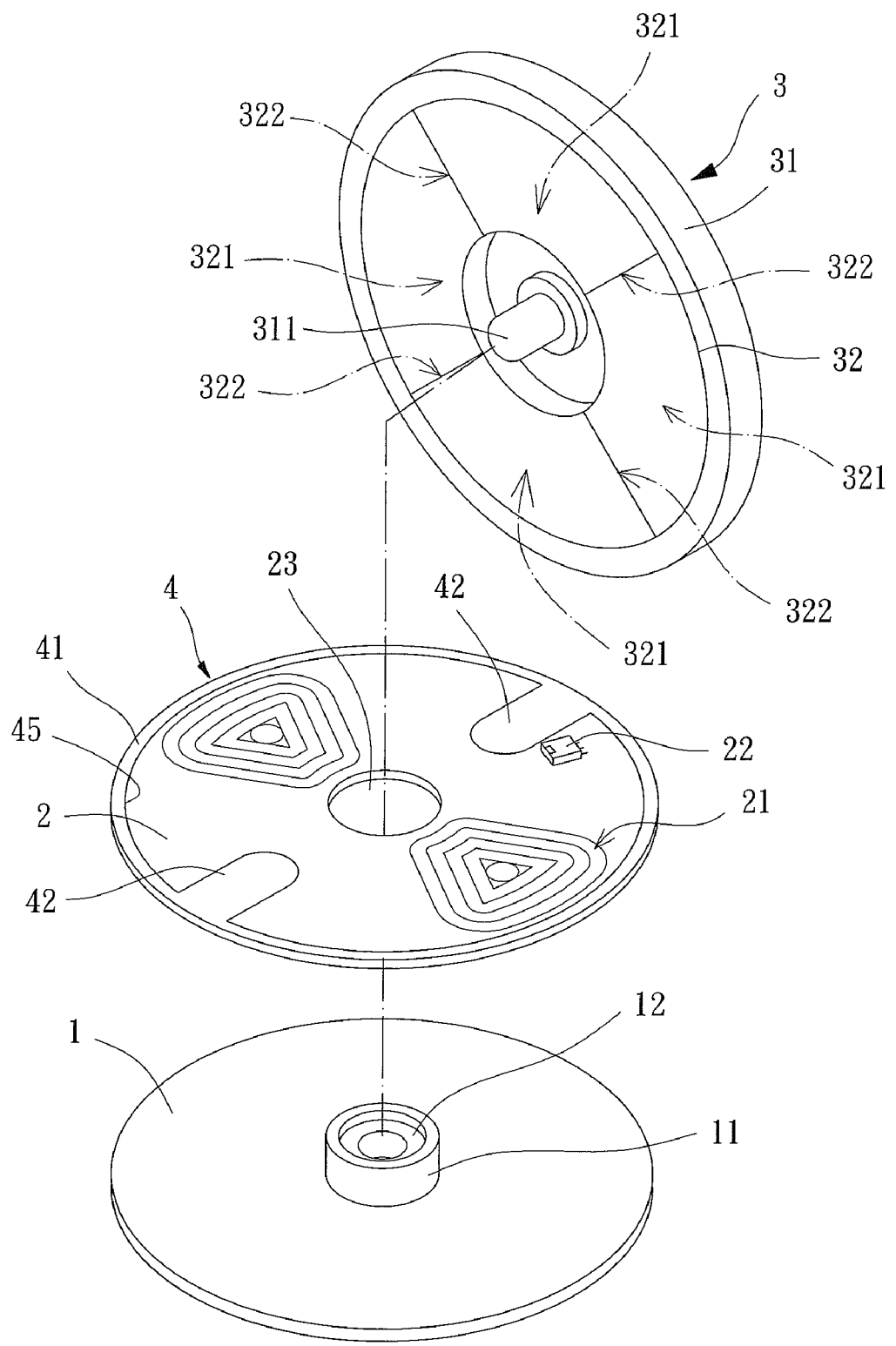
FIG. 6 shows an exploded, perspective view of a miniature motor of a second example of the first embodiment according to the preferred teachings of the present invention.
Figure 7:
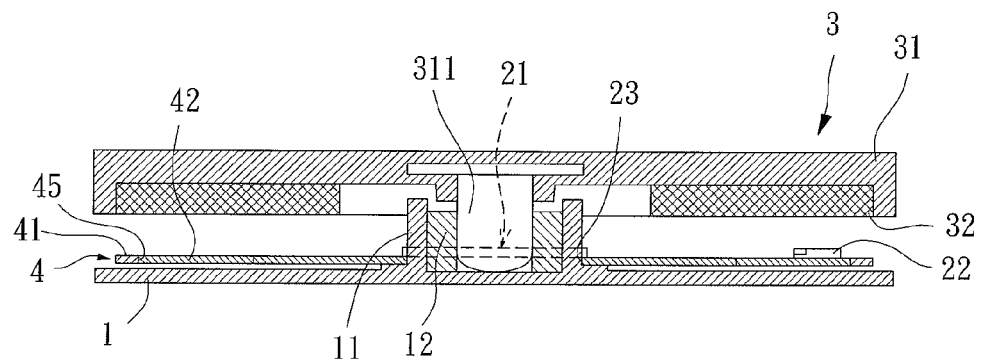
FIG. 7 shows a cross sectional view of the miniature motor of FIG. 6.
Figure 8:
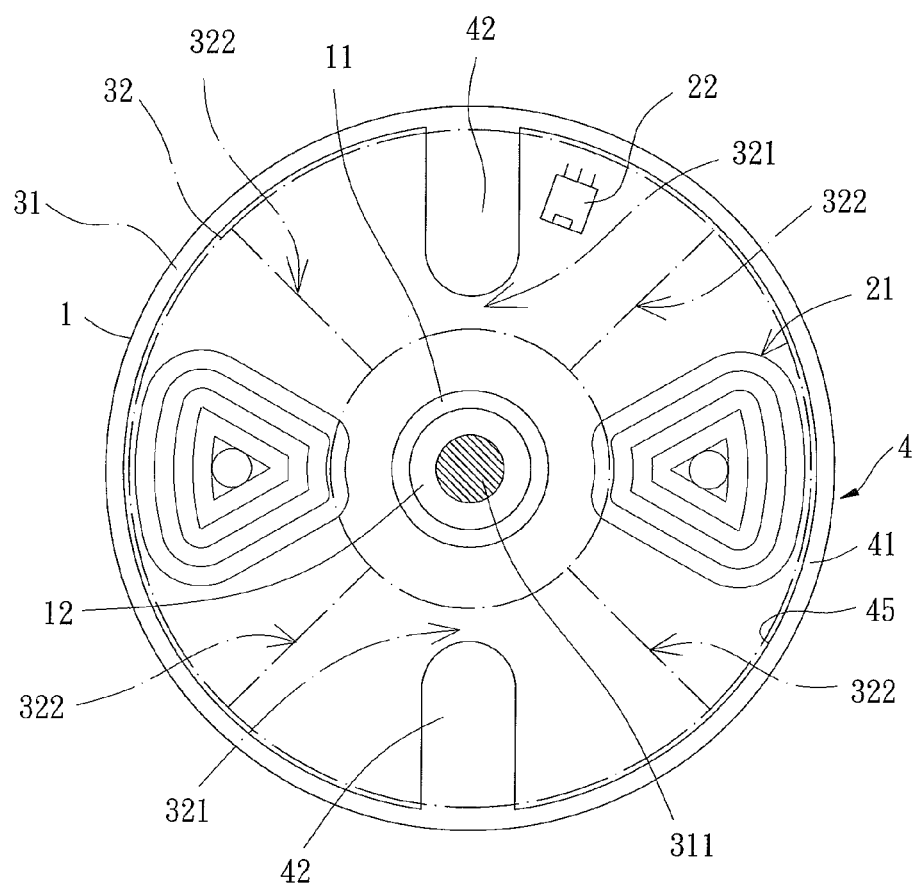
FIG. 8 shows a top view of the miniature motor of FIG. 6.

In a second example shown in FIGS. 6-8, the miniature motor includes an annular auxiliary starting member 4 having a ring 41 and two diametrically opposed magnetic attraction pieces 42 extending radially inward from an inner periphery of the ring 41. Furthermore, the magnetic attraction pieces 42 are aligned with the permanent magnet 32 along the axis of the hub 31. By such an arrangement, in addition to stopping the rotor 3 in an optimal position for starting, the magnetic attraction pieces 42 attract the permanent magnet 32 to maintain rotational stability during rotation of the rotor 3. Further, the ring 41 includes a central assembling hole 45. The circuit board 2 is mounted in and has a shape corresponding to the central assembling hole 45. Further, the circuit board 2 has an axial height the same as the auxiliary starting member 4, with two sides of the circuit boards 2 respectively flush with two sides of the auxiliary starting member 4.

Figure 9:
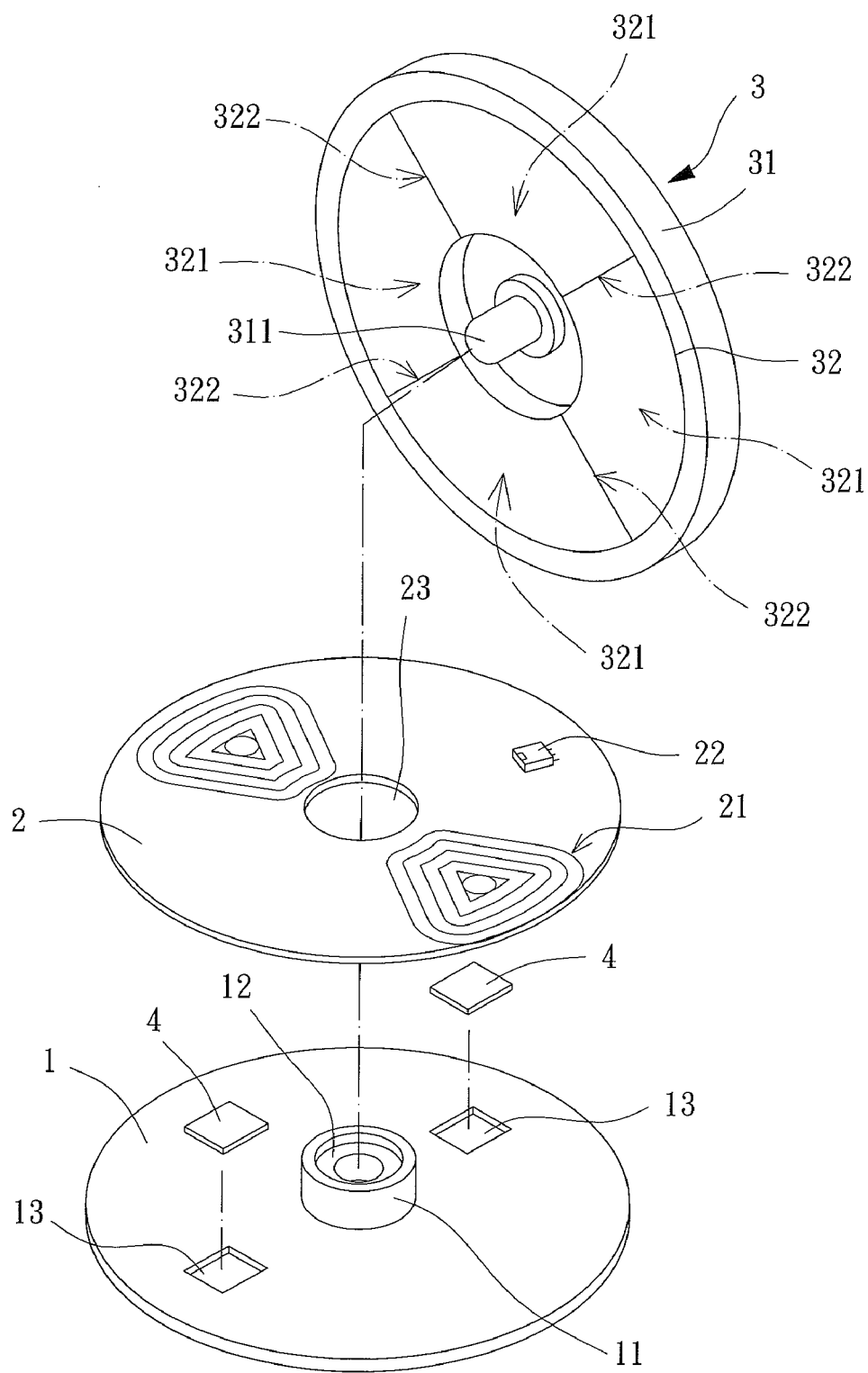
FIG. 9 shows an exploded, perspective view of a miniature motor of a third example of the first embodiment according to the preferred teachings of the present invention.
Figure 10:
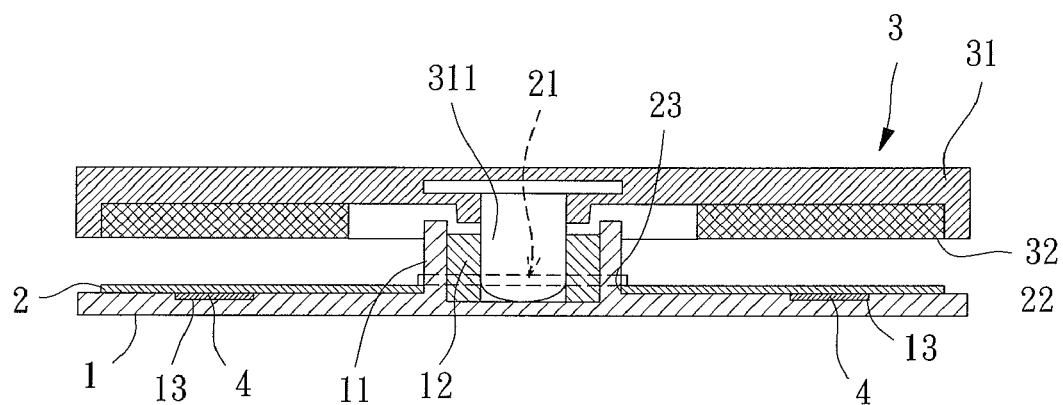
FIG. 10 shows a cross sectional view of the miniature motor of FIG. 9.
Figure 11:
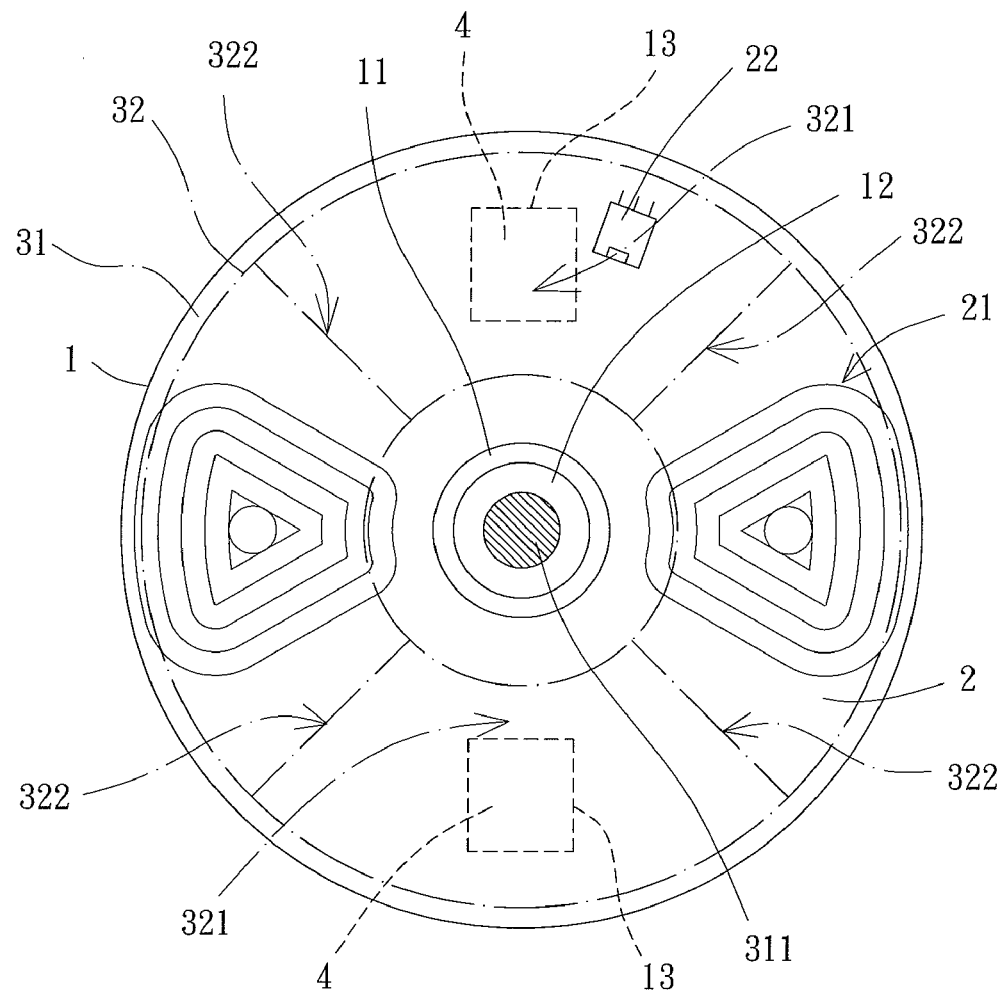
FIG. 11 shows a top view of the miniature motor of FIG. 9.
Figure 11A:
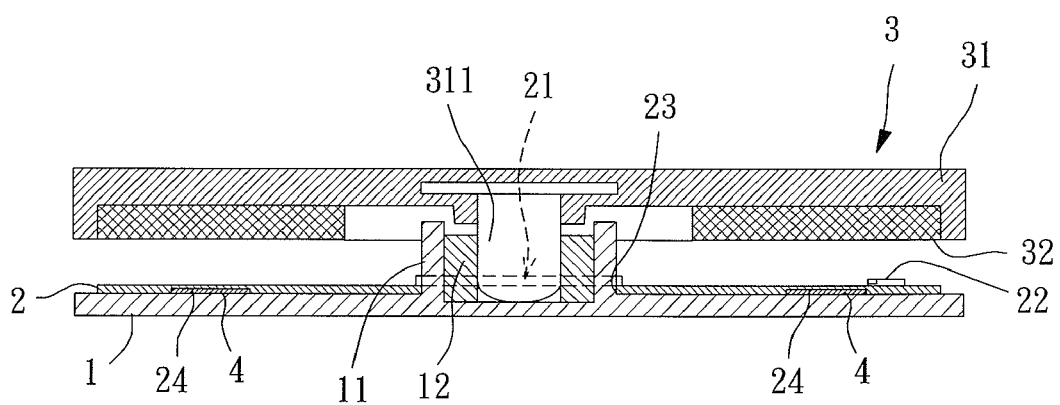
FIG. 11a shows a cross sectional view of a fourth example of the first embodiment according to the preferred teachings of the present invention.

In a third example shown in FIGS. 9-11a, the miniature motor includes two auxiliary starting members 4 between the circuit board 2 and the substrate 1, such that the circuit board 2 can directly abut against the auxiliary starting members 4 to reliably position the auxiliary starting members 4. Specifically, two positioning grooves 13 are formed in a side of the substrate 1 facing the circuit board 2, and the auxiliary starting members 4 are securely mounted in the positioning grooves 13 as shown in FIGS. 9-11. Alternatively, two positioning grooves 24 can be formed in a side of the circuit board 2 facing the substrate 1 and securely receive the auxiliary starting members 4 as shown in FIG. 11a. Thus, by embedding the auxiliary starting members 4 in the positioning grooves 13, 24, the axial height of the miniature motor can be further reduced after assembly of the substrate 1, the circuit board 2, and the auxiliary starting members 4, while providing a better positioning effect. It can be appreciated that the miniature motor of the third example can include only one auxiliary starting member 4 and only one positioning groove 13, 24.

According to the third example shown in FIGS. 9-11, the auxiliary starting members 4 are diametrically opposed and aligned with the permanent magnet 32 along the axis of the hub 31. Thus, the auxiliary starting members 4 can also stop the rotor 3 in an optimal position for starting while maintaining rotational stability of the rotor 3, which advantages are substantially the same as those provided by the second example shown in FIGS. 6-8.

In the preferred forms shown in FIGS. 3-11, the coil unit 21 includes a plurality of coils formed on a side of the circuit board 2 by layout, effectively reducing the axial height of the circuit board 2 and simplifying the structure of the circuit board 2, allowing compact, miniature designs of motors according to the teachings of the present invention.

In the preferred forms shown in FIGS. 3-11, an axial gap is formed between the permanent magnet 32 of the rotor 3 and the coil unit 21. By such an arrangement, compared to conventional motors with radial air gaps, the miniature motor with the axial gap according to the teachings of the present invention has a simplified structure and reduced overall volume while allowing easy starting.

Figure 12:
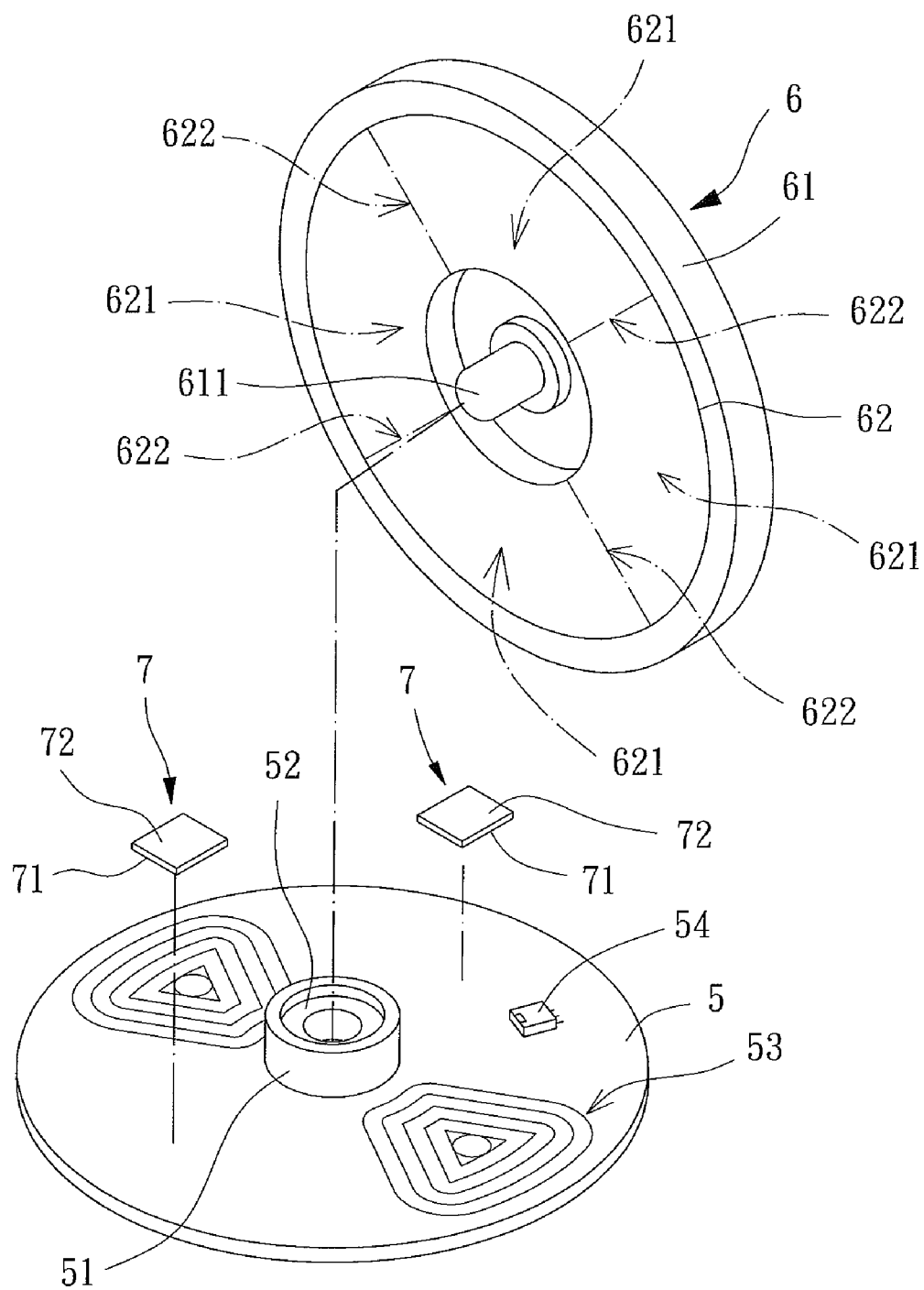
FIG. 12 shows an exploded, perspective view of a miniature motor of a second embodiment according to the preferred teachings of the present invention.
Figure 13:
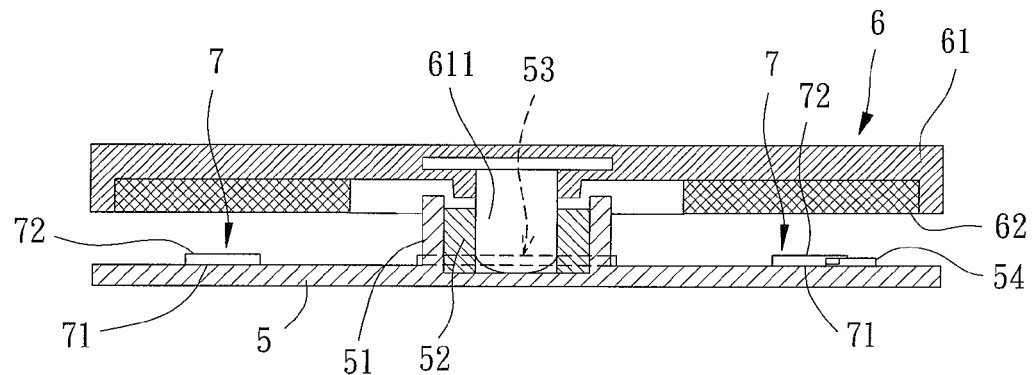
FIG. 13 shows a cross sectional view of the miniature motor of FIG. 12.
Figure 14:
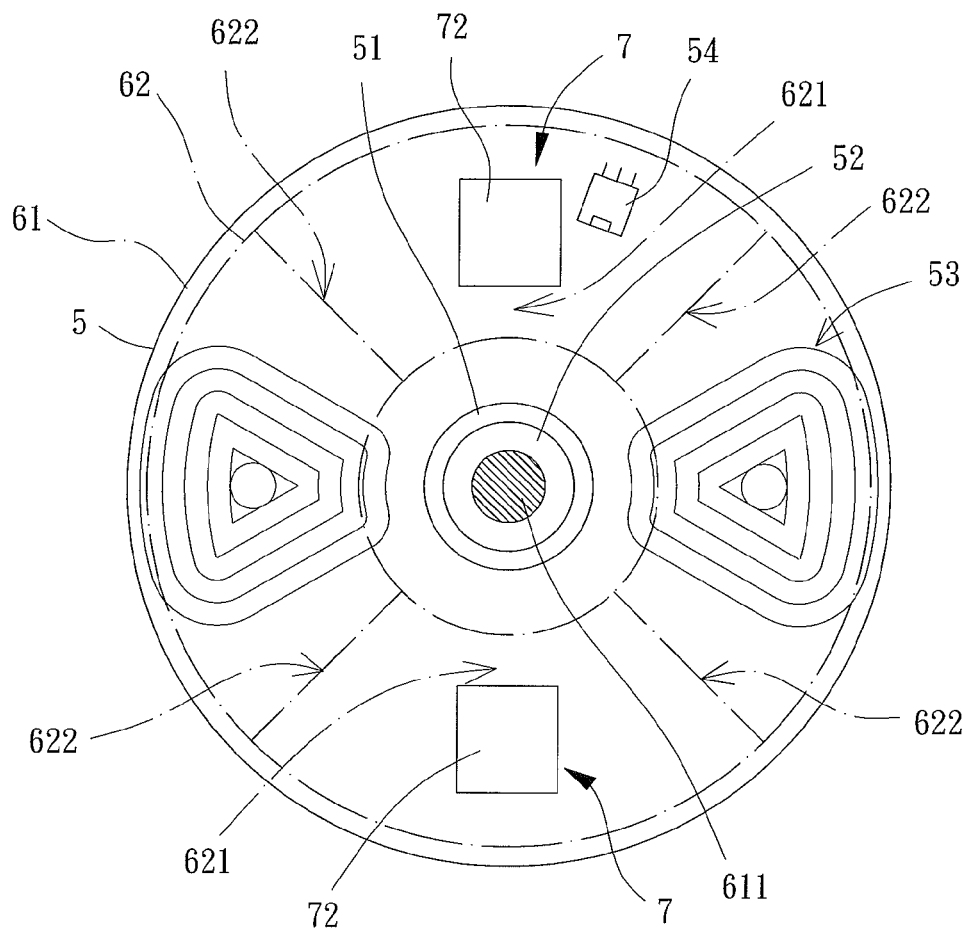
FIG. 14 shows a top view of the miniature motor of FIG. 12.

FIGS. 12-14 show a miniature motor of a second embodiment according to the preferred teachings of the present invention. The miniature motor includes a substrate 5, a rotor 6, and at least one auxiliary starting member 7. The rotor 6 is rotatably mounted to the substrate 5. The at least one auxiliary starting member 7 is mounted between the substrate 5 and the rotor 6 to allow easy starting of the rotor 6.

The substrate 5 includes a pivotal portion 51 on a side thereof. In the preferred form shown in FIGS. 12-14, the pivotal portion 51 is in the form of a shaft tube receiving a bearing 52. Furthermore, the substrate 5 includes a coil unit 53 and a detection element 54 surrounding the pivotal portion 51. The coil unit 53 can be comprised of a plurality of coils. The detection element 54 detects the polarity of a magnetic pole.

The rotor 6 includes a hub 61 and a permanent magnet 62. The hub 61 includes a shaft 611 rotatably mounted to the pivotal portion 51 of the substrate 5. The permanent magnet 62 is annular and mounted to an inner periphery of an annular wall of the hub 61. The permanent magnet 62 is aligned with the coil unit 53 and the detection element 54 along an axis of the hub 61. Furthermore, the permanent magnet 62 includes a plurality of north poles N and a plurality of south poles S. The north and south poles N and S are alternately disposed and can be formed by magnetic charging. Each of the north and south poles N and S includes a stronger magnetism section 621 having stronger magnetism and distant to an adjoining section of a pair of north and south poles N and S adjacent to each other. A weaker magnetism section 622 having weaker magnetism is formed between two adjacent stronger magnetism sections 621 and located in the adjoining section of a pair of north and south poles N and S.

The at least one auxiliary starting member 7 is in the form of a magnetically attractive plate mounted between the substrate 5 and the rotor 6. The auxiliary starting member 7 includes an engaging face 71 and a magnetic attraction face 72 opposite to the engaging face 71. The engaging face 71 is in surface contact with a side of the substrate 5, and the magnetic attraction face 72 faces the permanent magnet 62.

In use of the miniature motor of the second embodiment according to the preferred teachings of the present invention, the coil unit 53 can be coupled to an external circuit board for driving the rotor 6 to rotate. With reference to FIG. 14, when the rotor 6 stops rotating, the at least one of the stronger magnetism sections 621 of the permanent magnet 62 attracts at least one auxiliary starting member 7 to assure stopping of the rotor 6 in an optimal position for starting, allowing easy starting and avoiding dead angles of starting. Furthermore, compared to the first embodiment, the second embodiment does not include the circuit board 2 to further simplify the structure and further reduce the axial height of the miniature motor.

Furthermore, the miniature motor of the second embodiment can include two diametrically opposed auxiliary starting members 7 to maintain rotational stability of the rotor 6. Further, the coil unit 53 can include a plurality of coils formed on a side of the substrate 5 by layout, and an axial air gap is formed between the permanent magnet 62 of the rotor 6 and the coil unit 53, effectively reducing the axial height of the miniature motor. Alternatively, at least one positioning groove can be formed in a side of the substrate 5 for receiving the at least one auxiliary starting member 7, providing a better positioning effect for the at least one auxiliary starting member 7.

According to the above, the miniature motors according to the teachings of the present invention allow easy starting and avoid dead angles of starting by providing at least one auxiliary starting member 4, 7. Furthermore, the miniature motors according to the teachings of the present invention have a simplified structure and allow easy manufacturing at low costs while allowing easy starting. Further, the miniature motors according to the teachings of the present invention have reduced axial heights and allow compact, miniature designs.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A miniature motor comprising:
a substrate including a pivotal portion;
a circuit board mounted to the substrate and including a coil unit and a detection element;
a rotor including a hub and a permanent magnet, with the rotor rotatably mounted to the pivotal portion of the substrate, with the permanent magnet mounted to the hub and aligned with the coil unit and the detection element, with the permanent magnet including a plurality of north poles and a plurality of south poles, with each of the plurality of north and south poles including a stronger magnetism section, with a weaker magnetism section formed between two adjacent stronger magnetism sections; and
at least one magnetically attractive auxiliary starting member mounted between the substrate and the rotor and aligned with the permanent magnet, with the circuit board located intermediate the substrate and the rotor, with said at least one auxiliary starting member engaged between the circuit board and the substrate, with the circuit board located intermediate the rotor and the auxiliary starting member and separating the auxiliary starting member from the rotor,
wherein, when the rotor stops rotating, said at least one auxiliary starting member aligns with and is magnetically attracted by at least one of the stronger magnetism sections of the permanent magnet, locating the detection element in a position not aligned with the weaker magnetism sections along an axis of the hub.

2. The miniature motor as claimed in claim 1, with the substrate including a side facing the circuit board, with the side of the substrate including at least one positioning groove, and with said at least one auxiliary starting member engaged in said at least one positioning groove.

3. The miniature motor as claimed in claim 1, with the circuit board including a first side facing the substrate and a second side facing the rotor, with the first side of the circuit board including at least one positioning groove extending towards but spaced from the second side, and with said at least one auxiliary starting member engaged in said at least one positioning groove spaced from the second side.

4. The miniature motor as claimed in claim 3, with said at least one auxiliary starting member including two diametrically opposed auxiliary starting members.

5. The miniature motor as claimed in claim 3, with the permanent magnet of the rotor and the coil unit having an axial gap therebetween.

6. The miniature motor as claimed in claim 3, with the coil unit formed on a side of the circuit board by layout.

7. The miniature motor as claimed in claim 3, with the plurality of north poles and the plurality of south poles of the permanent magnet alternately disposed.

8. A miniature motor comprising:
a substrate including a pivotal portion;
a circuit board mounted to the substrate and including a coil unit and a detection element;
a rotor including a hub and a permanent magnet, with the rotor rotatably mounted to the pivotal portion of the substrate, with the permanent magnet mounted to the hub and aligned with the coil unit and the detection element, with the permanent magnet including a plurality of north poles and a plurality of south poles, with each of the plurality of north and south poles including a stronger magnetism section, with a weaker magnetism section formed between two adjacent stronger magnetism sections; and
at least one magnetically attractive auxiliary starting member mounted between the substrate and the rotor and aligned with the permanent magnet, with said at least one auxiliary starting member including a ring having an inner periphery and two diametrically opposed magnetic attraction pieces extending radially inward from the inner periphery of the ring, and with the two magnetic attraction pieces aligned with the permanent magnet along the axis of the hub,
wherein, when the rotor stops rotating, said at least one auxiliary starting member aligns with and is magnetically attracted by at least one of the stronger magnetism sections of the permanent magnet, locating the detection element in a position not aligned with the weaker magnetism sections along an axis of the hub.

9. The miniature motor as claimed in claim 8, with the ring including a central assembling hole, and with the circuit board mounted in the central assembling hole.

10. The miniature motor as claimed in claim 9, with the circuit board having an axial height along the axis of the hub equal to that of said at least one auxiliary starting member, with each of the circuit board and said at least one auxiliary starting member having two sides, and with the two sides of the circuit board respectively flush with the two sides of the auxiliary starting member.

11. A miniature motor comprising:
   a substrate including a first side, a second side opposite to the first side, and a pivotal portion, with a coil unit and a detection element provided around the pivotal portion;
   a rotor including a hub and a permanent magnet, with the rotor rotatably mounted about an axis to the pivotal portion of the substrate, with the permanent magnet mounted to the hub and aligned with the coil unit and the detection element, with the first and second sides spaced parallel to the axis, with the permanent magnet including a plurality of north poles and a plurality of south poles, with each of the plurality of north and south poles including a stronger magnetism section, with a weaker magnetism section formed between two adjacent stronger magnetism sections; and
   at least one magnetically attractive auxiliary starting member mounted to the substrate and aligned with the permanent magnet, with said at least one auxiliary starting member including an engaging face and a magnetic attraction face, with the first side having at least one positioning groove spaced from the second side, and with said at least one auxiliary starting member engaged in said at least one positioning groove intermediate the first and second sides,
   wherein, when the rotor stops rotating, said at least one auxiliary starting member aligns with and is magnetically attracted by at least one of the stronger magnetism sections of the permanent magnet, locating the detection element in a position not aligned with the weaker magnetism sections along an axis of the hub.

12. The miniature motor as claimed in claim 11, with said at least one auxiliary starting member including two diametrically opposed auxiliary starting members.

13. The miniature motor as claimed in claim 11, with the permanent magnet of the rotor and the coil unit having an axial gap therebetween.

14. The miniature motor as claimed in claim 11, with the plurality of north poles and the plurality of south poles of the permanent magnet alternately disposed.

15. The miniature motor as claimed in claim 11 with the at least one magnetically attractive auxiliary starting member located intermediate the substrate and the rotor with the magnetic attraction face facing the permanent magnet.

* * * * *